United States Patent [19]

Murray III

[11] Patent Number: 4,780,632
[45] Date of Patent: Oct. 25, 1988

[54] ALTERNATOR HAVING IMPROVED EFFICIENCY

[75] Inventor: James F. Murray III, Piscataway, N.J.

[73] Assignee: MKH Partners, Randolph, N.J.

[21] Appl. No.: 112,025

[22] Filed: Oct. 21, 1987

Related U.S. Application Data

[63] Continuation of Ser. No. 852,995, Apr. 17, 1986.

[51] Int. Cl.$^4$ ............................................ H02K 39/00
[52] U.S. Cl. .................................... 310/111; 310/261; 310/216
[58] Field of Search ............... 310/111, 155, 216, 261, 310/266, 171

[56] References Cited

U.S. PATENT DOCUMENTS

| | | | |
|---|---|---|---|
| 2,917,699 | 12/1959 | Grant | 310/111 |
| 3,132,269 | 5/1964 | Craske | 310/111 |
| 3,321,652 | 5/1967 | Opel | 310/168 |
| 3,956,649 | 5/1976 | Silverman | 310/111 |
| 4,639,626 | 1/1987 | McGee | 310/168 X |
| 4,659,953 | 4/1987 | Luneau | 310/111 |

FOREIGN PATENT DOCUMENTS

| | | |
|---|---|---|
| 0174290 | 3/1986 | European Pat. Off. |
| 1538242 | 10/1969 | Fed. Rep. of Germany. |
| 2386181 | 10/1978 | France. |
| 1263176 | 2/1972 | United Kingdom. |

*Primary Examiner*—Mark O. Budd
*Assistant Examiner*—Judson H. Jones
*Attorney, Agent, or Firm*—Caesar, Rivise, Bernstein, Cohen & Pokotilow, Ltd.

[57] ABSTRACT

An alternator having a rotor which extends obliquely with respect to its axis of rotation between at least a pair of pole pieces having power windings disposed therein with the turns of the windings facing the pivotal axis of the rotor. Upon driving the rotor in rotation, the rotor due to its oblique configuration causes the flux extending with respect to the pole pieces to reciprocate with respect to the pivotal axis and the power windings, thereby producing two cycles of alternating current for each rotation of the rotor. The form of the rotor can substantially correspond to a portion of a cylinder having oppositely disposed face portions extending obliquely with respect to the central axis of the of the cylinder which is substantially coincident with the pivotal axis of the rotor. The periphery of the rotor thereby generates a cylindrical figure of revolution as the rotor is rotated.

32 Claims, 10 Drawing Sheets

ALTERNATOR HAVING IMPROVED EFFICIENCY

This application is a continuation of application Ser. No. 852,995, filed Apr. 17, 1986.

BACKGROUND OF THE INVENTION

1. Field of the Invention

The invention relates to the field of electrical power generation and more particularly to alternating current generators or alternators. The invention also relates to alternators in which the lateral axis of the rotor is disposed at an oblique angle with respect to the axis of rotation of the rotor. The oblique angle results in the rotor having its angular momentum distributed with respect to two separate axes.

2. Description of the Prior Art

Notwithstanding the increased interest in energy conservation over the last decade, no substantial advance has been made in increasing the efficiency of electrical generating apparatus. Rather, the art has made incremental advances, but in general produces electrical energy with apparatus having approximately the same efficiencies as those used several decades ago.

For example, U.S. Pat. No. 3,321,652, issued to Opel on May 23, 1967, teaches a reduction in windage losses which is achieved by employing a solid rotor having no windings thereon. The rotor incorporates two poles, separated by an area of non-magnetic material. The field coils are coupled to the rotor poles by means of an air gap. The stator windings undergo the same fluctuations in magnetic field as if windings were present on the rotor.

U S. Pat. No. 3,571,639, issued to Tiltins on Mar. 23, 1971, discloses a solid rotor which is made up of alternating magnetic and non-magnetic sections, interleaved by extending finger-like members, and with a magnetic section in the center. This construction provides a two-section alternator capable of increasing the alternator output power for a given shaft speed.

U.S. Pat. No. 3,398,386, which issued to Summerlin on Aug. 20, 1968, also teaches a rotor for a synchro device in which the rotor is without windings and without poles. Rather, the rotor has one face inclined obliquely to the axis of the rotor in order that a point on the stator windings receives magnetic flux in varying strength, depending upon the width of the rotor opposite that point.

Yet another approach is offered by Imris in U.S. Pat. No. 3,760,205 which issued on Sept. 18, 1973. In this patent, the rotor is shaped as a helically-wound flat band which receives magnetic flux through air gaps coupled to the poles of the field magnet. As the rotor rotates, a varying length of the rotor band is coupled to the field source, thus varying the reluctance of the rotor and hence the field strength impressed upon the stator windings.

Therefore, it can be seen that the prior art of alternator constructions despite years of effort has not achieved changes in alternator construction based upon new principles which could dramatically increase the conversion efficiency of the alternator.

SUMMARY OF THE INVENTION

It is therefore an object of the present invention to provide an alternator operating at significantly higher efficiencies than those known to the art.

A further object of this invention is to provide an alternator capable of producing a higher-frequency output per shaft revolution per pole set than is known to the art.

Another object of this invention is to provide an alternator which can derive useful work from the reactive power which usually contributes only to the losses in present alternating current generating systems.

These and other objects are achieved in the present invention by providing an alternator with a stator element carrying a combination of field windings and power windings and a rotor which reciprocates the magnetic field across said power windings with substantially simple harmonic motion.

One embodiment of the invention employs a rotor fabricated from a stack of laminated disks, pressed upon an arbor which is obliquely disposed with respect to the intended axis of rotation, and integrally machined in order to provide the assembly with a peripheral contour equivalent to that of a cylinder. The stator is formed of two salient pole projections, each having a concave pole face whose radius is slightly greater than the radius of the rotor. The rotor thereby defines an air gap of continuous dimension when rotated. The rotor is in series with the two pole pieces to complete the magnetic circuit. As the rotor is rotated, the zone at which the flux is coupled to the pole pieces varies in position along the length of each pole face. The magnetic flux is swept forward and then backward across the power windings during each revolution, thereby inducing a voltage therein. Since the magnetic flux reverses its direction of motion, but never its intrinsic polarity, there is a generation of force at the point of reversal which acts in concert with the force provided by the prime mover. Thus, an alternator constructed according to the present invention will produce a given volume of output power for a significantly reduced volume of input power.

BRIEF DESCRIPTION OF THE DRAWINGS

FIGS. 8A–8F are schematic representations of horizontal sections of the invention showing the magnetic flux between the stator and rotor for six different rotational positions for one rotation of the rotor;

DETAILED DESCRIPTION OF A PREFERRED EMBODIMENT

Figure 1:
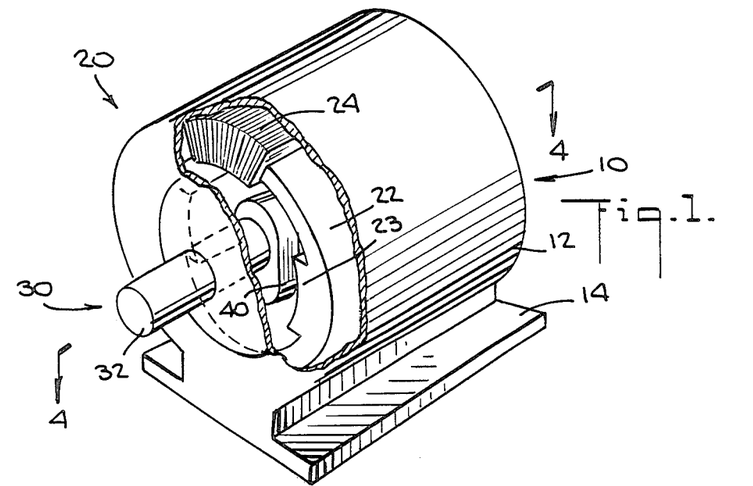
FIG. 1 is a perspective view of a preferred embodiment of the alternator of the invention, partially cut away to illustrate interior components thereof.
Figure 7:
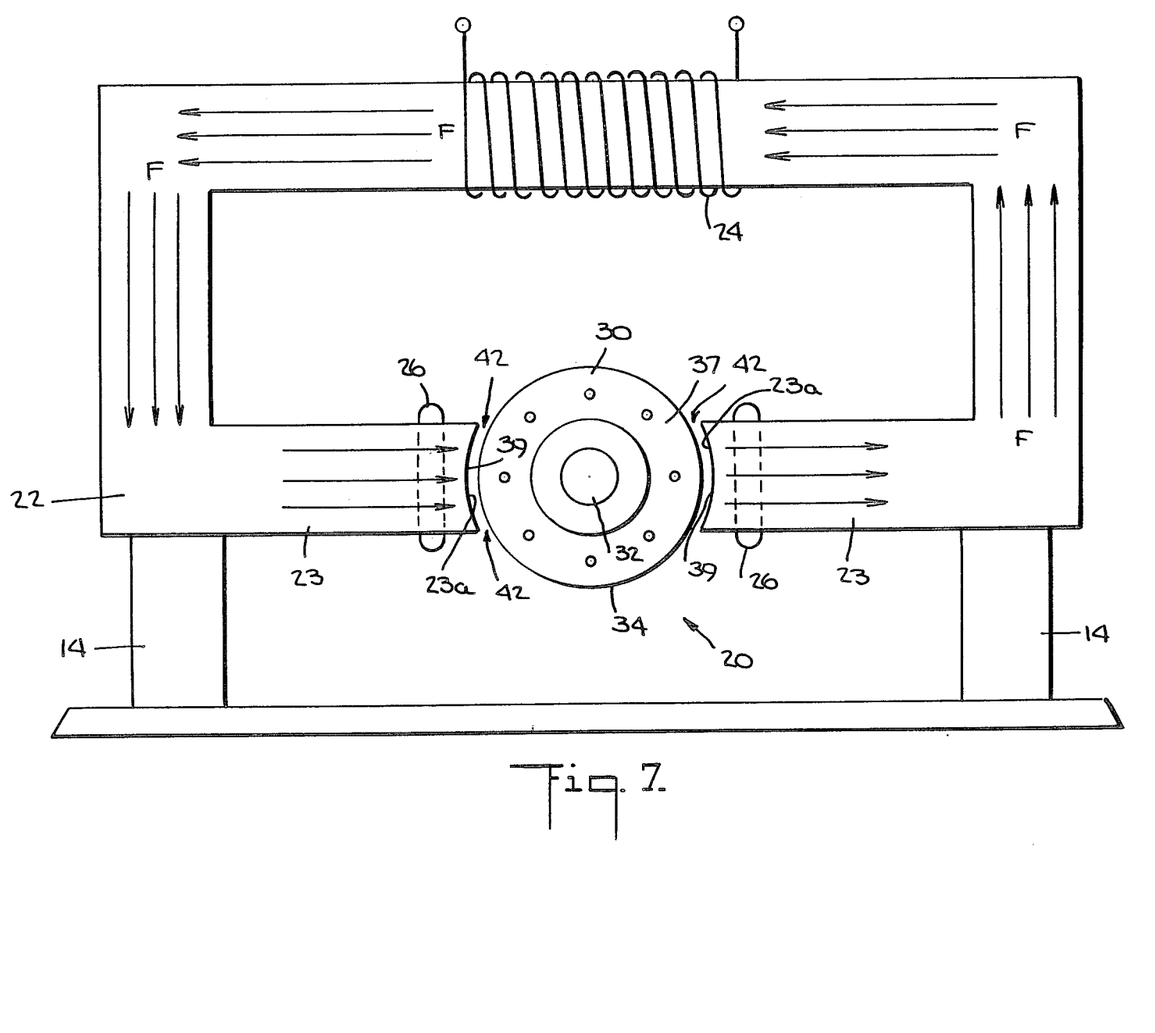
FIG. 7 is a schematic representation of the magnetic circuit of the alternator of the invention.

FIGS. 1 and 7 show a preferred embodiment of the alternator 20 of the invention. The alternator comprises a stator assembly 22 and a rotor assembly 30 disposed within a housing 12. The housing is supported by a base member 14.

Figure 2:
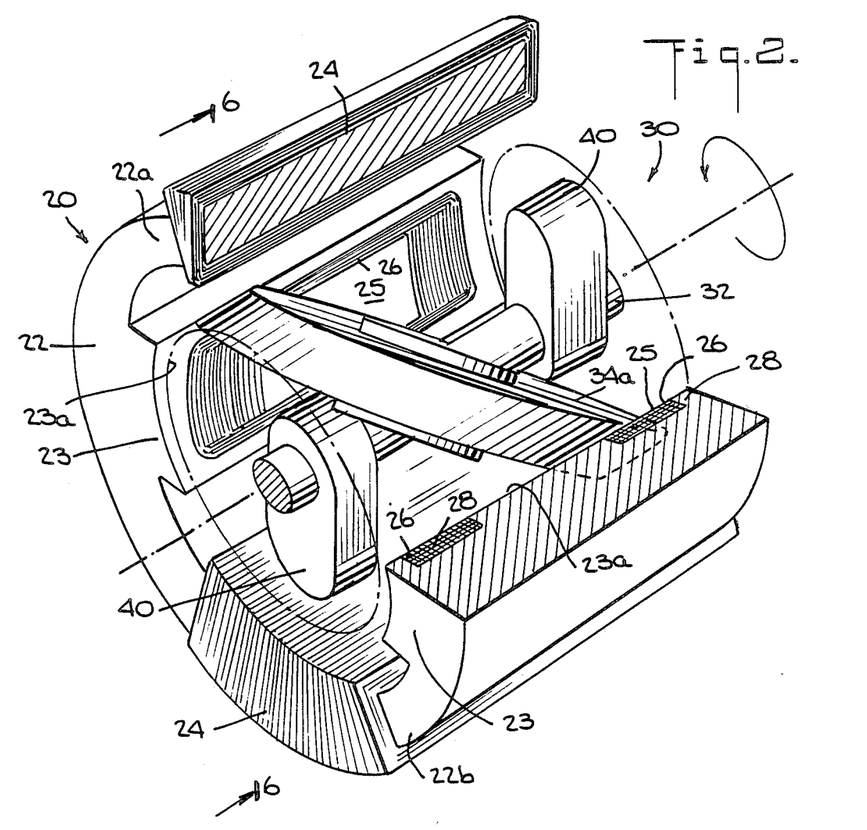
FIG. 2 is a perspective view of the stator and rotor assemblies of the embodiment shown in FIG. 1, cut away to show interior components thereof.

In FIG. 2 it can be seen that the stator assembly 22 has the general form of a hollow cylinder. The stator assembly is formed of a highly permeable material and is provided with two pole pieces 23 which extend radially inwardly and terminate in concave faces 23a.

The stator assembly 22 carries two sets of windings. Field windings 24 may be carried on the stator body in a convenient location, for example, at the top portion 22a and the bottom portion 22b of the stator iron as shown in FIG. 2. The constructional details of such windings are well-known to the art.

Figure 3:
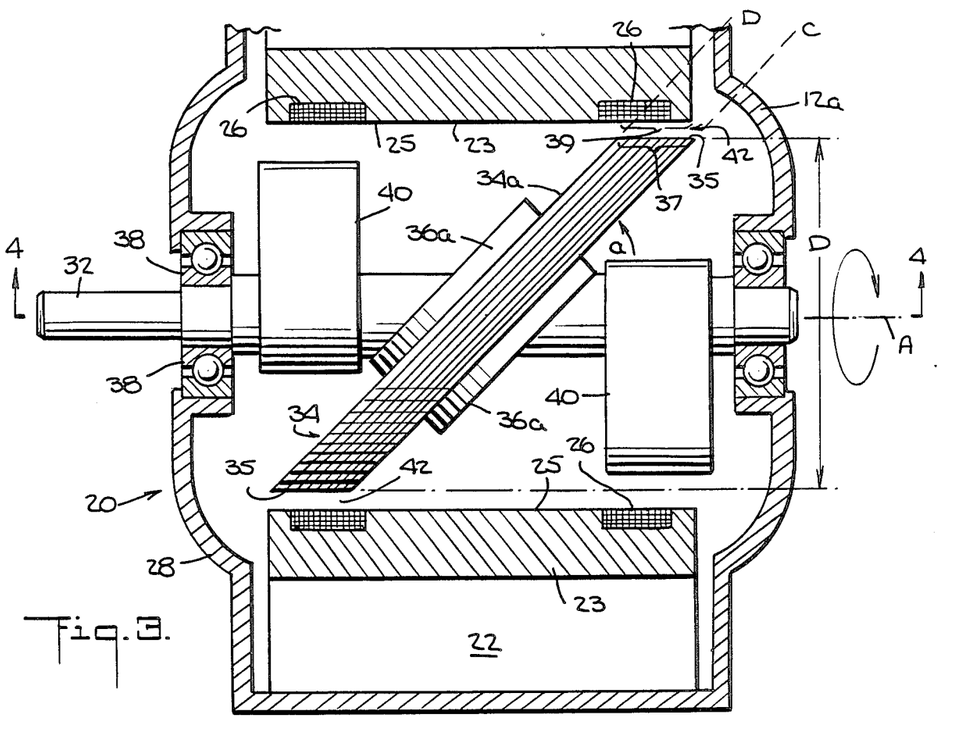
FIG. 3 is a horizontal section of the embodiment of the invention shown in FIG. 1 with the maximum dimension of the rotor disposed adjacent to the end portions of the pole pieces.

Power windings 26 are also carried by the stator assembly with one or more windings on each pole piece 23. (FIGS. 2 and 7). The windings 26 are located in slots 28 extending in to the face 23a of each pole piece 23. The slots should be of sufficient depth to insure that the windings 26 disposed in them do not protrude into the air gap 42 (FIGS. 3 and 7). It should be noted that the embodiment of the invention, i.e., alternator 20, comprises one pair of pole pieces 23; however the alternator of the invention can be constructed in embodiments containing multiple pairs of poles.

Figure 6:
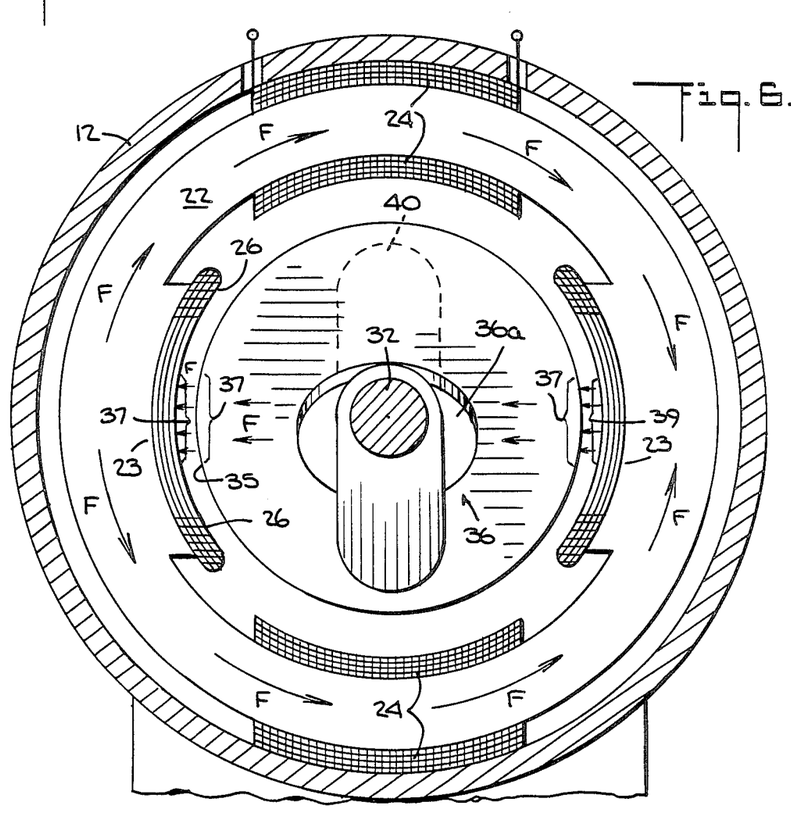
FIG. 6 is a vertical section taken along the line 6—6 in FIG. 2.

The rotor assembly 30 can best be seen in FIGS. 2, 3, and 6. A shaft 32 carries a rotor 34 within the hollow cylinder defined by the stator body. The shaft is journaled on suitable bearings 38 (FIG. 3) mounted in each of the opposite ends 12a of the casing 28. A prime mover (not shown), is connected to shaft 32 to provide a driving torque. The rotor 34 is fabricated from material having high permeability, preferably, electrical steel, such as a stack of silicon steel laminations to reduce or minimize eddy currents. The rotor 34 is secured to shaft 32 by an arbor 36a. Counterweights 40 can be mounted on the shaft 32 to provide a balanced mechanical structure.

Figure 4:
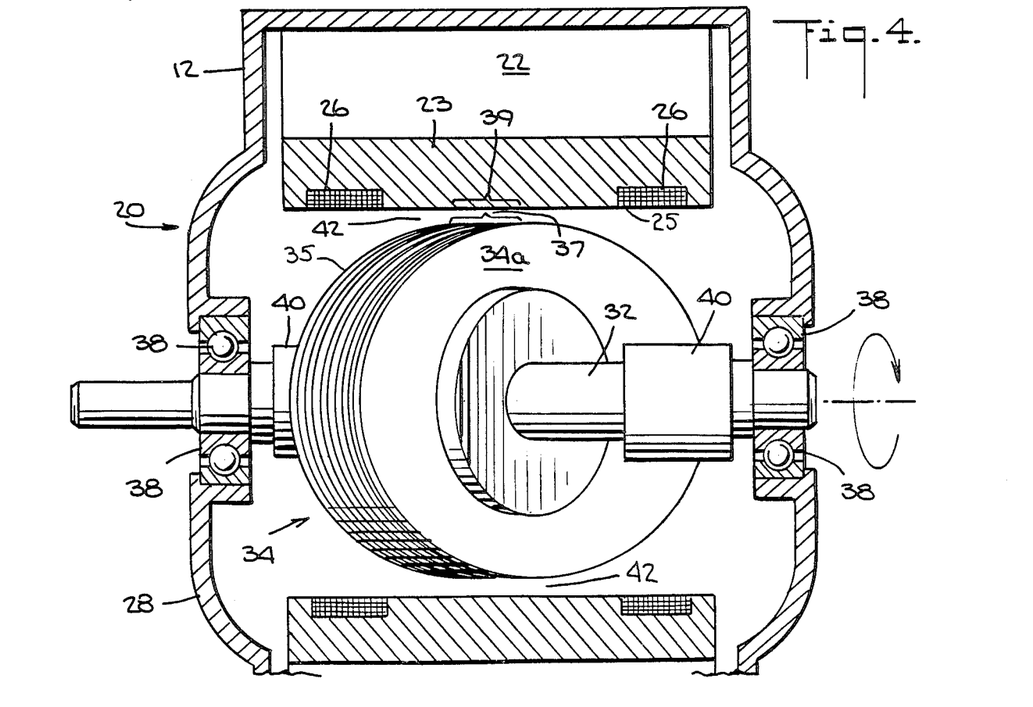
FIG. 4 is a horizontal section of the embodiment of the invention shown in FIG. 1 with the minimum dimension of the rotor disposed adjacent to the central portions of the pole pieces.
Figure 5:
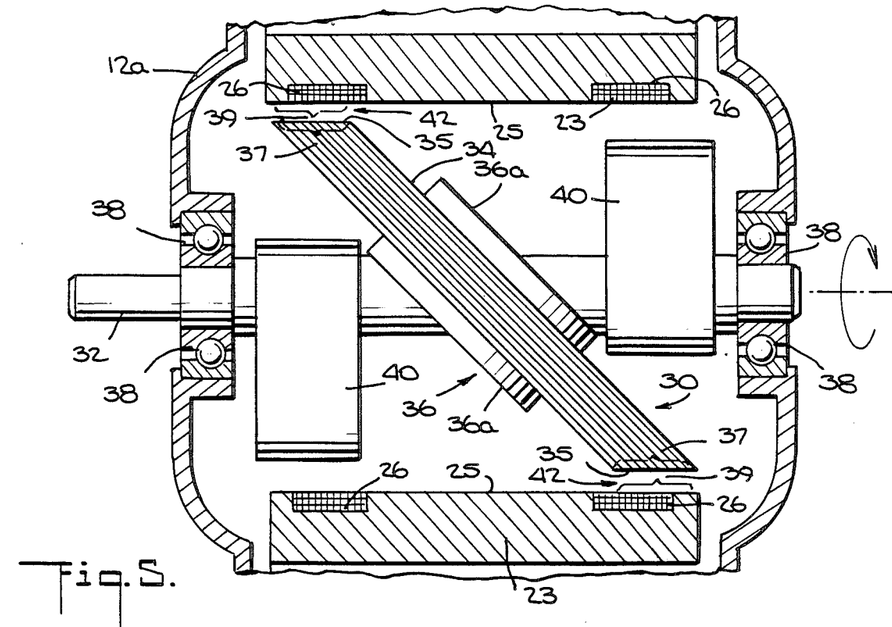
FIG. 5 is a horizontal section of the embodiment of the invention shown in FIG. 3 with the rotor turned 180 in the direction of the arrow from the position shown in FIG. 3.
Figure 5A:
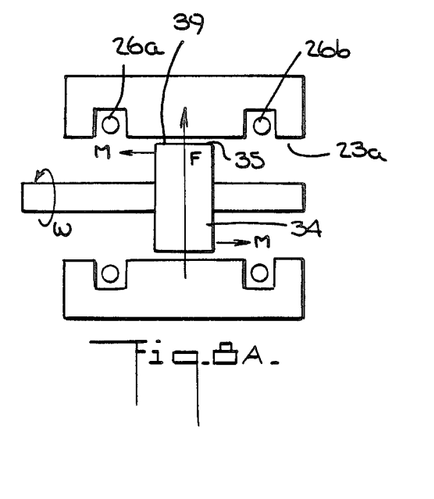
Figure 5B:
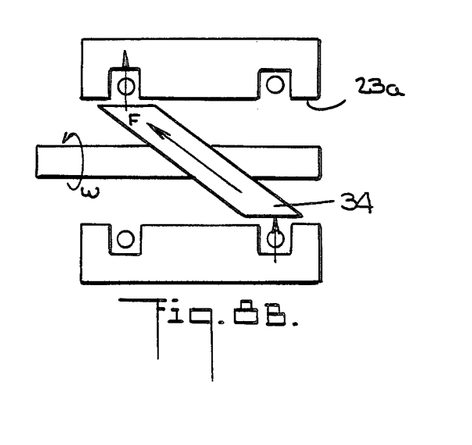
Figure 5C:
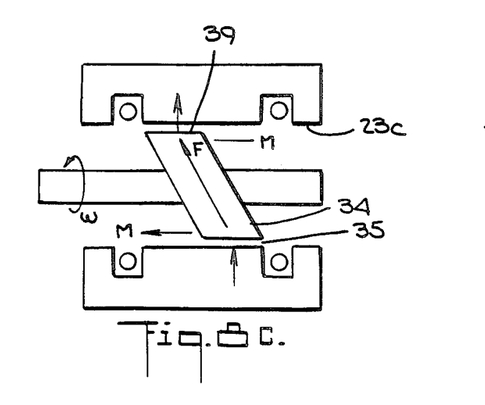
Figure 5D:
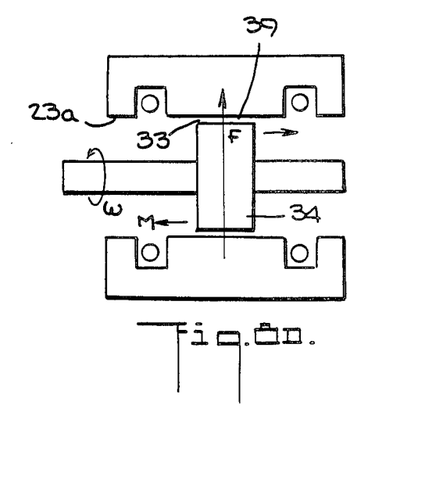
Figure 5E:
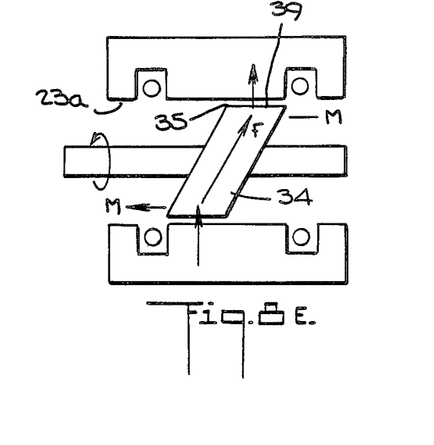
Figure 5F:
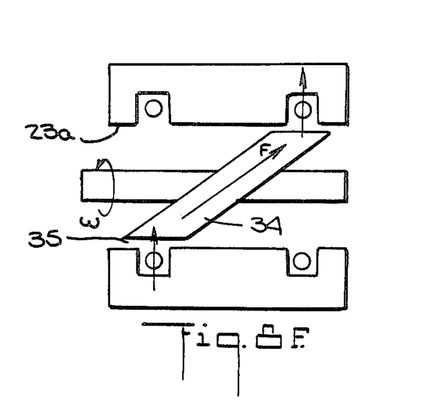

The form of the rotor 34 as shown in FIG. 3, is a section of a cylinder having a diameter D and an axis A, which is cut by two parallel planes "B" and "C". In the preferred embodiment, angle "a" is 45°. FIG. 3 shows the rotor at the beginning of a cycle of rotation when the rotor is seen as if on edge. FIG. 4 shows the rotor viewed 90° from the position of FIG. 3. In this position, the face 34a of the rotor can be seen to be elliptical. FIG. 5 shows the rotor after a movement of 180° from the position shown in FIG. 3.

The areas on the rotor edge 35 and a portion of the faces of the pole pieces 23 are referred to as coupling zones 37 and pole face flux zones 39, respectively (FIGS. 3-6, 10C and 10D). The pole face flux zones oscillate along the length of each pole face with simple harmonic motion as the rotor assembly is revolved. Thus, the position of the upper pole flux zone 39 as shown in FIG. 3 is located at the right-hand end of the pole face, while the same zone as shown in FIG. 4 is located at the center of symmetry of the power winding. In FIG. 5, this zone has travelled to the left-hand end of the pole face. Thus, as the rotor stack turns through the next 180°, the pole face flux zones 39 return to the position shown FIG. 3. These zones execute harmonic motion with respect to Operation of the alternator according to the present invention requires the presence of a d.c. excitation current in the field windings 24 and the application of a torque to shaft 32. The current flowing in the field windings 26 produces a stationary magnetic field in the stator iron 22 with the lines of flux tending to flow in the magnetic circuit by following the path of least reluctance, as illustrated by arrows F in FIG. 6 and as shown in FIG. 7. Flux will flow through the stator 22 to the flux zone 39 of pole pieces 23. From there, flux will pass across the air gap 42 to the flux zone 37 of the rotor 34, returning across the air gap 42 to the pole piece of opposite polarity, and then back to the stator. Thus, the rotor magnetically couples the two pole faces 23a, by providing a low-reluctance path between the pole pieces. Since the peripheral portions of the rotor are parallel to the pole faces, a maximum flow of flux will be obtained across the entire thickness of the rotor.

A more detailed understanding of the operation of this invention can be gained from FIGS. 8A-8F. FIGS. 8A-8F are each a schematic representation of a cross-section of a face 23a of a pole piece face and the opposing rotor edge portion 35 of the rotor 34, taken at different points during one cycle of rotation of the rotor. FIG. 8A depicts a point in the rotor cycle at which the flux zone 39 is located midway between the conductors of power winding segments 26a and 26b. As noted above, the rotor geometry results in the flux zones being moved reciprocally back and forth across the faces of the pole pieces. As shown in FIG. 8A, the rotor edge (and thus, the flux zone 39) is being accelerated in the direction of arrow M, toward power winding segment 26a.

FIG. 8B depicts the situation after 90° of rotor rotation in the direction of the arrow. Here, the flux zone has moved to overlap power winding segment 26a with rate of change of flux becoming zero. Accordingly, the voltage becomes practically zero. This is the location at which the point of reversal in direction of the flux zone takes place. FIG. 8C shows the situation after another 45° of rotation. The pole face flux zone has returned part way toward the midpoint of the power winding in a direction extending toward power winding segment 26b.

FIG. 8D depicts the condition at 90° of rotation with the pole face flux zone 39 at the midpoint between winding segments 26a and 26b.

In FIG. 8E there is shown the condition after another 45° of rotation.

In FIG. 8F, the pole flux zone is at an extreme point of movement relative to the pole piece face and including power winding segment 26(b). No directional arrow is shown since the zone is momentarily at rest with respect to the pole piece face. In this way, a full cycle is completed.

FIGS. 9A-9I graphically shows the operation of the alternator of the invention in terms of the relevant mechanical and electrical parameters. Each graphic function shown in FIGS. 9A-9I relate by degree markings to points in a single cycle of rotation of the rotor. The velocity of the pole face flux zones with respect to a point on the pole face is plotted at FIG. 9A. As a result of geometry of the rotor, the velocity is sinusoidal in form.

Figure 9A:
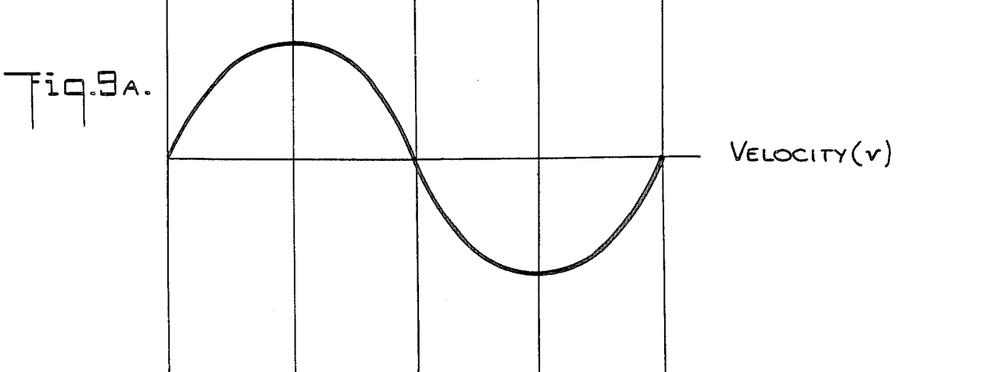
FIGS. 9A-9I are graphical representations of nine electrical and mechanical characteristics for a complete rotation of the rotor.
Figure 9B:
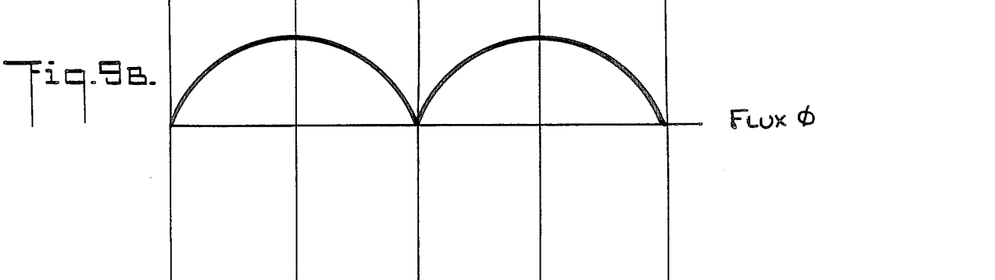

Flux ($\phi$) is plotted in FIG. 9B. As shown, the relative flux concentration alternates from zero to a maximum value twice each cycle without undergoing a reversal of its magnetic polarity. The flux does not vary sinusoidally, but exhibits a complex harmonic variation which can be expressed mathematically as a Fourier series as follows:

$$\phi = \phi m(1 + 2/3 \cos 2\,wt - 2/15 \cos 4\,wt + \tfrac{2}{3} \cos 6\,wt + \ldots)$$

where $\phi m$ is the maximum flux.

The expression above reveals an important advantage of the present invention. As shown by the appearance of the number "1" in the flux equation, the flux carries a component analagous to a "direct current component" of a complex electrical waveform, caused by the fact that the flux never reverses polarity. Under these conditions, the iron domains within the pole pieces will not exhibit major hysteresis loops usually associated with oscillating flux. Thus, the present invention drastically reduces hysteresis losses which are particular to all flux-reversing systems. In addition, cooling requirements of the alternator are likewise reduced since smaller quantites of heat are generated by the reduced hysteresis losses in the pole pieces.

Figure 9C:
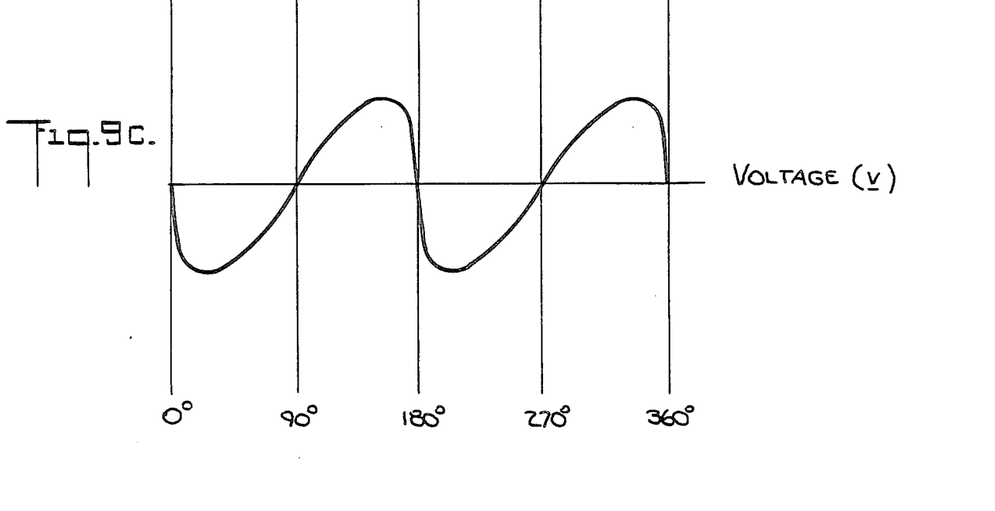
Figure 9D:
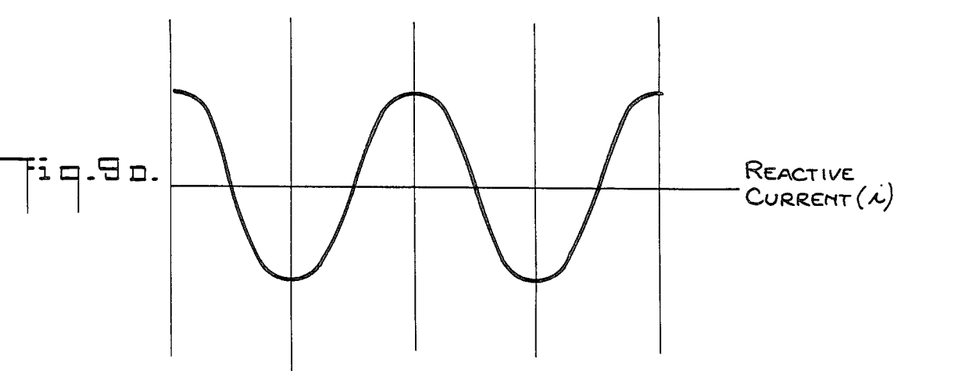
Figure 9E:
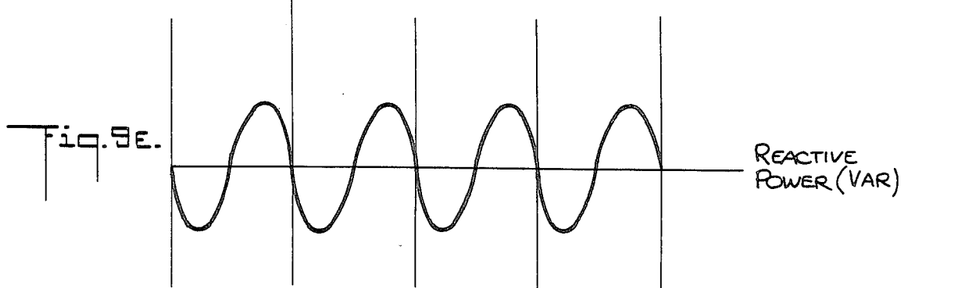

The voltage induced in the power windings is proportional to the rate of change of flux and may be calculated by the equation $V = -d\phi/dt$. Since the flux does not vary sinusoidally, the voltage will have a non-sinusoidal waveform. Differentiation of the Fourier series shown above results in an expression for the instantaneous voltage:

$$V = \phi m\,(4/3 \sin 2\,wt - 8/15 \sin 4\,wt + 12/35 \sin 6\,wt + \ldots).$$

This function is plotted in FIG. 9C. Note that the induced voltage oscillates through a complete cycle for every 180° of rotation of the rotor. Thus, the induced voltage has twice the frequency of the harmonic velocity of the flux and the angular velocity of the shaft. This fact has an important consequence, as the prior art teaches that a two-pole alternator can generate only one cycle of current for each revolution of the rotor. Thus, the prior art requires that a two-pole alternator must operate at 3600 r.p.m. in order to generate 60 cycle alternating current. By means of the alternator of the invention, a two-pole machine can produce 60 cycle alternating current at 1800 r.p.m.

The alternator of the invention also results in a reduction of iron-related losses which are proportional to rotor speed as well as loses stemming from mechanical friction and windage. Additionally, a reduction in shaft speed can offer increased reliability and longer life due to the reduction of wear in mechanical parts.

In an inductive circuit, such as that of the power windings of an alternator, it is well-known that a certain component of the current flows in a reactive relationship to the induced voltage. This "produces" a "reactive power component" referred to as "volt-amperes reactive", or "VAR" power. The average value of reactive power is zero, and it can make no contribution to the consumed power such as a resistive load. However, due to the fact that the flux changes its direction mechanically, the energy stored stored in the VAR component can be transformed into useful mechanical work, and assist the prime mover in rotating the rotor shaft. The prime mover must perform work to turn the rotor shaft and generate electricity. This phenomenon is the specific consequence of the more general Lenz' Law to an alternator.

The maximum power transfer theorem states that: "maximum power transfer between source and load occurs when the load impedance is the conjugate of the source impedance, and under these conditions, the source can transfer only 50 percent of the converted power to the load. In an alternator, the true EMF resides as a spatial vector referred to as a "motional" electric field. The total power dissipated in the source windings can be measured directly only in terms of the mechanical torque supplied to the generator's drive shaft as would be expected according to the dictates of the Lenz Law. The alternator's electrical phase angle, which is a "space" angle, is a measurement of the angular position of the conductors in space relative to the position of the generator's magnetic field poles when compared to the induced voltage. The oscillating VAR component is transformed into a mechanical tortional vibration residing in the generator's armature mass and drive shaft. This fact indicates that the alternator attempts to return the reactive power to its own source, the prime mover, on alternate quarter cycles. In an attempt to maximize the delivery of power to the load in accordance with the maximum power transfer theorem, the load impedance can be made conjugate to the power impedance by the addition of capacitance.

The maximum power transfer theorem describes the condition necessary to ensure optimal transmission of power from source to load. This theorem can be applied to power transmission theory, however, its main utilization is in the field of radio and telephone communications. The alternator of the invention utilizes a reverse power transfer concept, which was developed solely for alternating power applications, particularly those of a single phase nature, which involve specially designed elliptical rotor geometries.

Figure 10A:
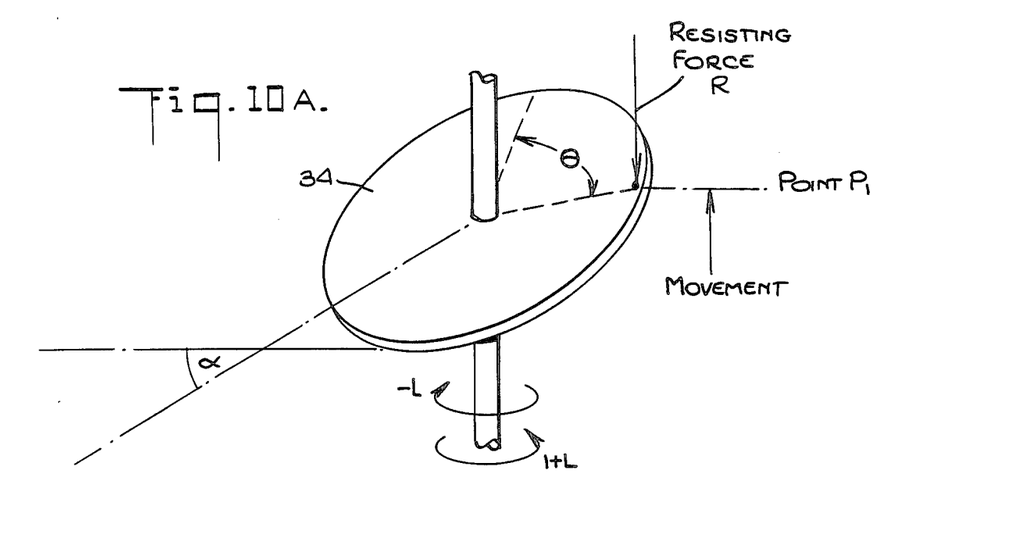
FIGS. 10A-10D are schematic representations depicting the interaction of magnetic and mechanical forces within the alternator of the invention.
Figure 10B:
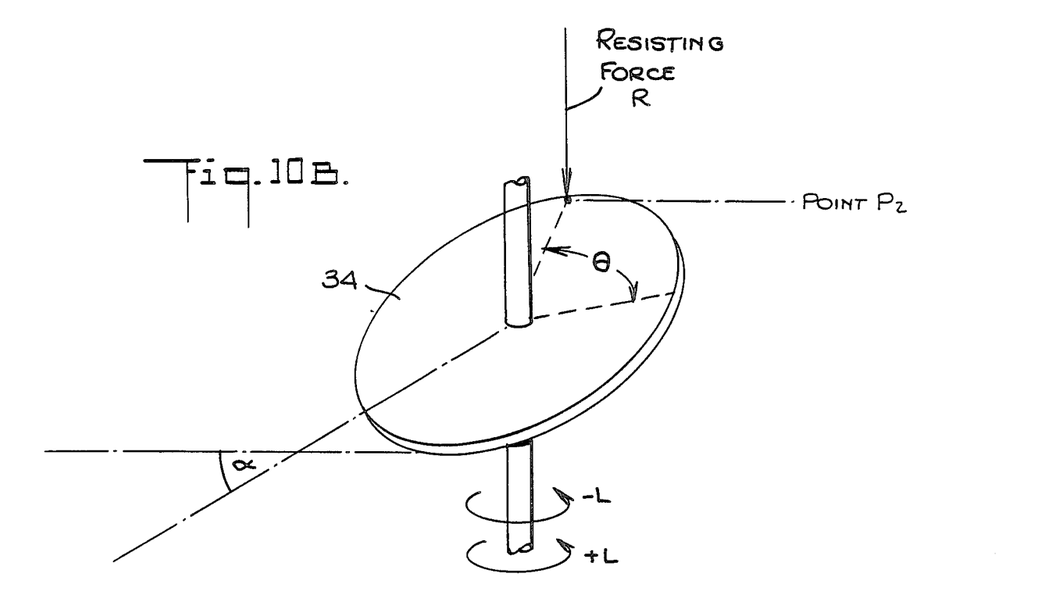
Figure 10C:
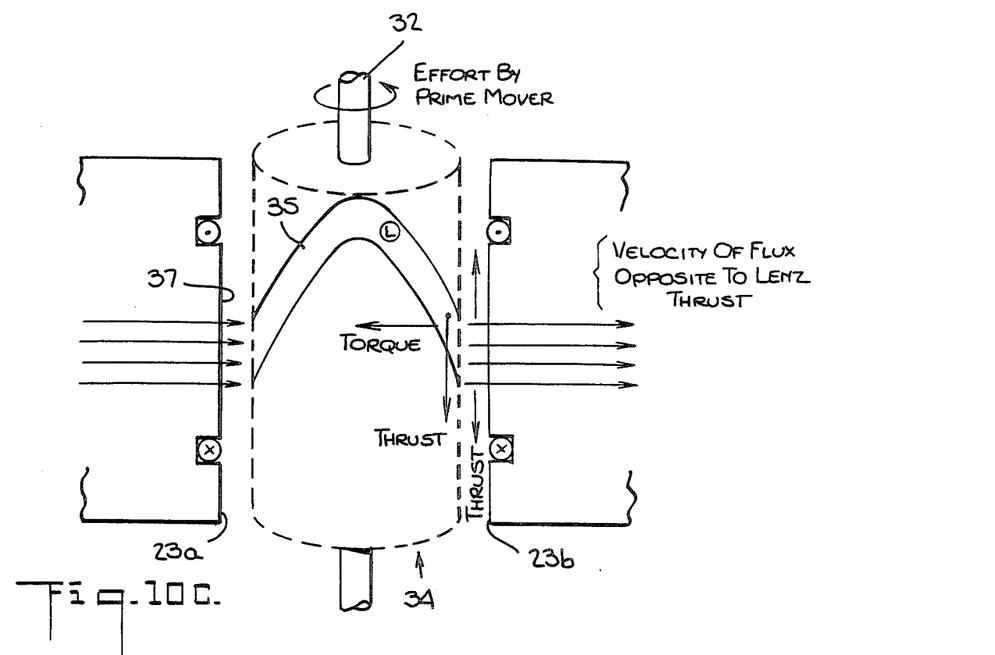

The basis of this concept can best be grasped by referring to FIG. 10C. This drawing shows an oval rotor 34 pictured within its cylindrical surface of revolution. At the instant depicted, the rotor 34 is so positioned that the flux is centered on each pole face, and is passing through the axis of symmetry of the lamination stack. As rotation proceeds, from left to right, the flux in the left pole face is moved in a downward direction, and begins to induce a voltage in 23a, the flux in the right pole face is moved in an upward direction and begins to induce a voltage in 23b. Assume for simplicity and by way of example, that the coils are connected in additive series, and that their output is short circuited. This will ensure that the windings are the only active components in the circuit, and that the power produced in them will be substantially reactive.

As current starts to build within the coils, an opposing force due to the Lenz reaction will attempt to thrust the flux in a direction opposite to that of its motion. This thrust will be parallel to the axis of rotation of shaft 32, and in an opposite sense for each pole. The action of these forces upon the lamination stack will be analogous to that of followers in the groove of a cylindrical cam. Hence, these lateral thrusts will be converted into torques which oppose the effort of the prime mover for one quarter cycle.

In FIG. 10A, a resisting force is shown by an arrow and identified by the letter R as being applied to point $P_1$ on the rotor. Another arrow marked $-L$ represents the torque created by this resisting force R. The arrow marked $+L$ represents the effort exerted by the prime mover. The system is in dynamic equilibrium as shown in FIG. 10A where torque $-L$ is equal and opposite to torque $+L$.

In FIG. 10B, the arrow marked $-L$ again represents the torque created by the resisting force R now applied to point $P_2$. The arrow marked $+L$ again represents the effort exerted by the prime mover. Since torque $+L$ and torque $-L$ are in the same direction, the system now accelerates.

If the resisting force R is moved from $P_1$ to $P_2$, the sense of $-L$ is reversed. Note that the disk has not been rotated, but the point of contact has been moved through an angle $\phi$. If the disk had been rotated and the resisting force remained fixed in space, the relative results would be the same, i.e., an assisting torque would suddenly appear after turning through the angle $\theta$.

Figure 10D:
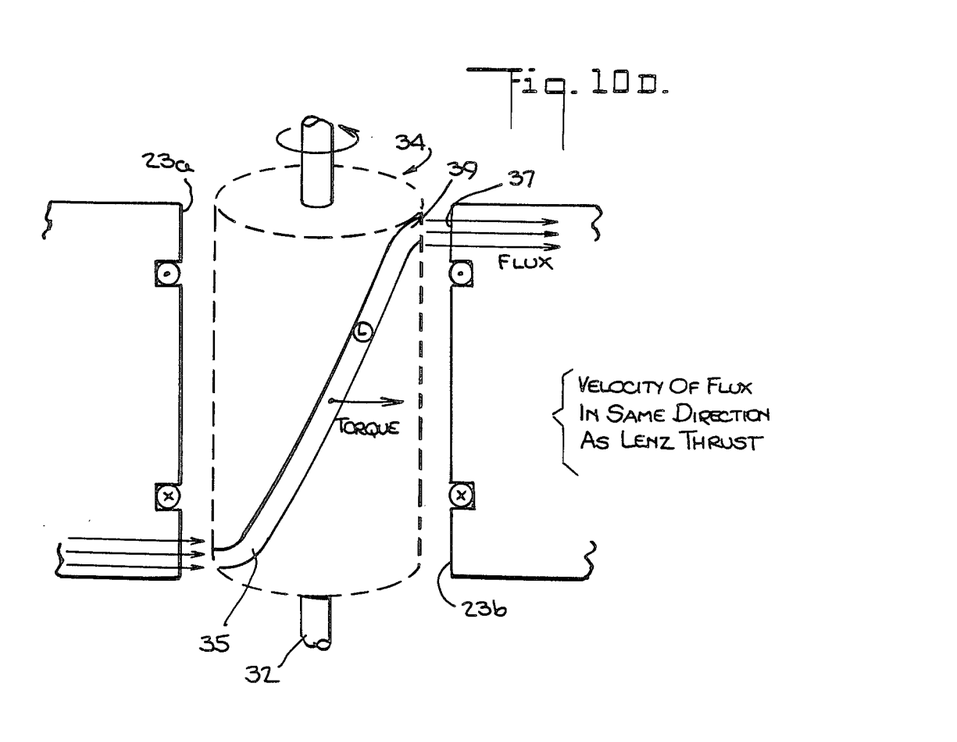

In FIG. 10D, the drive shaft 32 has rotated 90 mechanical degrees, and the lamination stack has traversed a space angle of 90 degrees relative to the pole faces. At the instant depicted, the harmonic velocity of the surface of the lamination stack relative to the pole faces is exactly zero, but about to reverse. At this point in time, the reactive current in each winding is just reaching its maximum value because it is 90 degrees out of phase with the induced voltage.

Hence, as each edge of the lamination stack begins to accelerate in the opposite direction, relative to the pole faces, magnetic forces produced by the current in each winding now attract the flux, and develop thrusts which operate in the same direction as that of the motion. Due to the cam-like design of the lamination stack, these actions give rise to torques which now assist the effort of the prime mover for the next quarter cycle.

This exchange of energy between the magnetic field of the inductor and the mass of the rotor 34 constitutes a form of resonance, which hereinafter is referred to as energy resonance, and which is the underlying principle in the concept of reverse power transfer.

Referring now to FIGS. 9A-9I, the relationships between the various mechanical power constituents and the magnetic flux can be studied. It should be noted that the velocity (v) shown in FIG. 9A is a sine function, and is in phase with the flux shown in FIG. 9B ($\phi$) for ½ a cycle and then 180 degrees out of phase with the flux for the next ½ cycle. Since the force (F) is a cosine function, the product of the velocity and the force produce a sinusodial wave of mechanical power (Pm) shown in FIG. 9F which oscillates at twice the frequency of the velocity. It must be understood that this wave function is representative of the mechanical power relative to the magnetic pole faces only. The power on the shaft as seen by the prime mover is a far more complex function.

The constituents of the electrical power can now be examined. Notice that the voltage (V) shown in FIG. 9C is twice the frequency of the velocity. Because of the inductive nature of the power circuit of the alternator being operated into a short circuit in the example referred to above when coils are connected in additive series, the current (I) lags the voltage by 90 degrees. The product of the voltage and the current yields a negative sine function with twice the frequency of the mechanical power. It must be understood that the ($R_R$) curve of FIG. 9I is representative of the reverse power transfer function, and as such, it can be interpreted as electrical power or mechanical power depending upon which side of the conversion boundry the observer chooses to focus his attention.

Figure 9F:
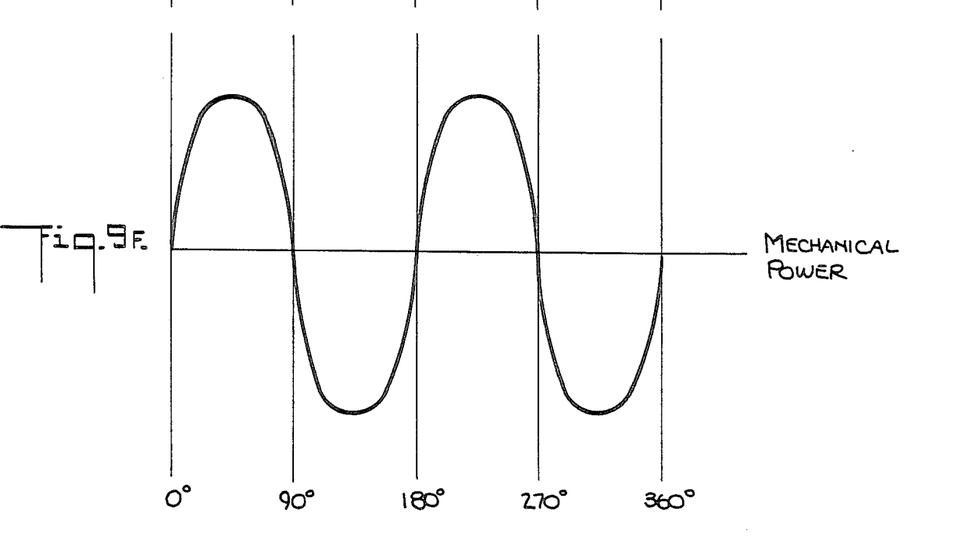
Figures 9G, 9H:
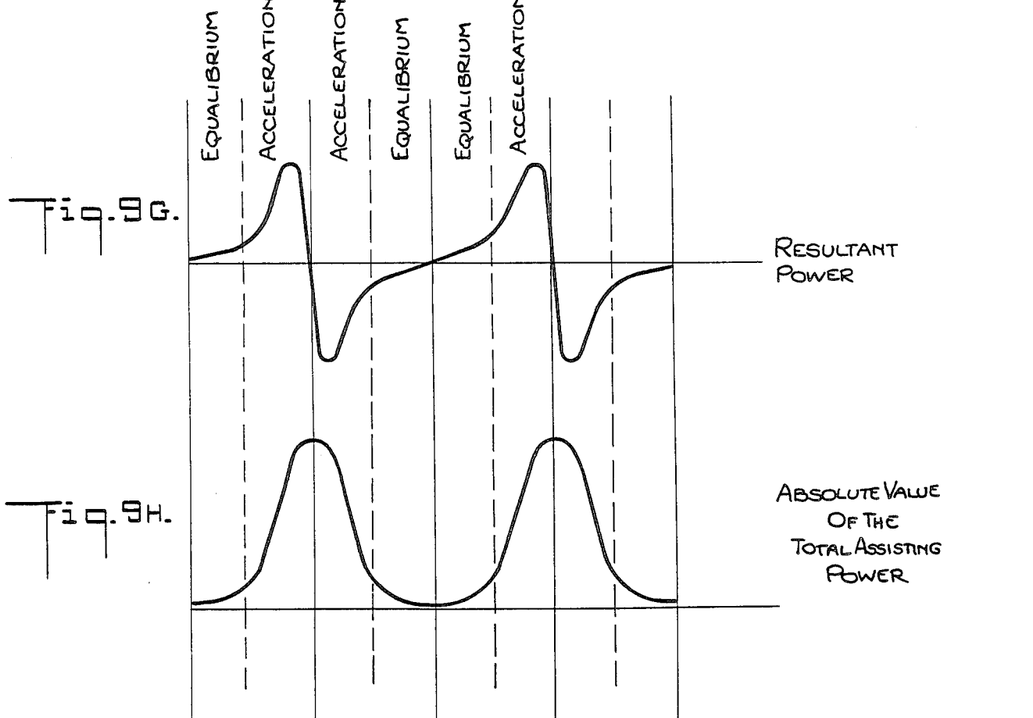
Figure 9I:
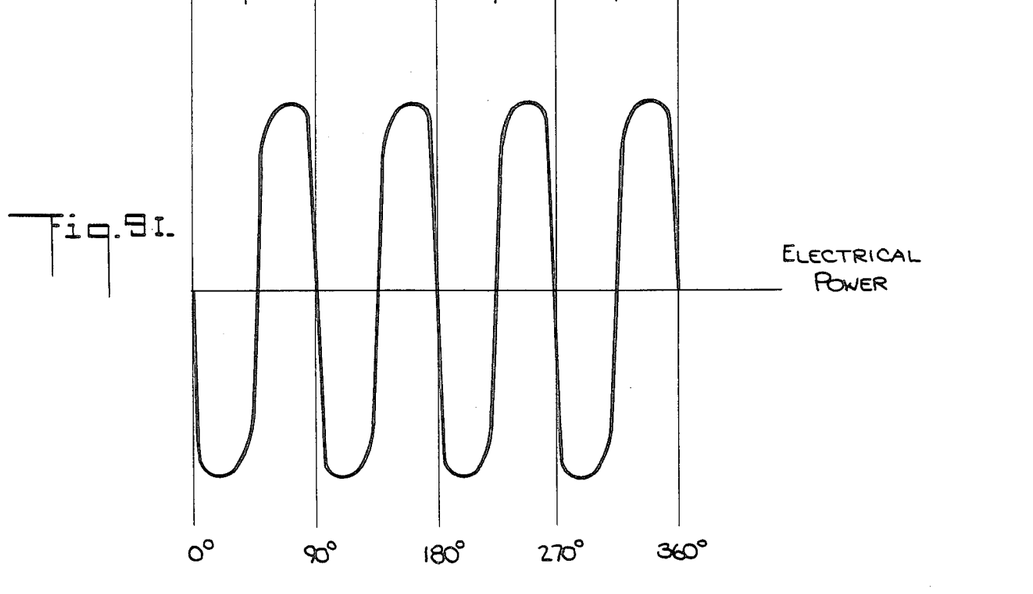

It is here assumed that the curve of ($P_R$) FIG. 9I represents the reverse power function on the mechanical side of the conversion boundry. This places both power waves in the mechanical domain and it immediately becomes clear that a "beat" will be established between the two frequencies. (FIGS. 9F and 9I).

Referring to FIGS. 9A-9I, it will be seen that for the first quarter cycle, the mechanical power (Pm) is 180 degrees out of phase with the reverse power ($R_R$). This is indicative of power flowing from the prime mover through the conversion barrier and into the magnetic fields of the power coils. The average values of these two wave fragments cancel, and result in nearly zero power in the first quadrant of the resultant power curve seen in FIG. 9G when the system is in equilibrium.

Just after 90 degrees, the reverse power function in FIG. 9I starts to go positive, and is now in phase with the second 90 degree portion of the mechanical power curve. This is indicative of power being returned to the prime mover from the magnetic fields of the power coils; however, this action coincides with the positive acceleration cycle of the lamination stack. Hence, the average values of these wave fragments reinforce, resulting in the high amplitude of the second quadrant of the resultant power curve seen in FIG. 9G. This curve is a second harmonic periodic function, and as such can cycle repeatedly.

If it were not for various losses which absorb most of the reflected power, this type of hetrodyne wave amplification could cause the system to accelerate to destruction if operated in the short circuit mode, as suggested in this example, i.e., pure mechanical resonance; however, with losses being numerous and rather high in electro-mechanical equipment, the net result is not acceleration, but rather a dimunition of the drive torque demanded by the alternator from the prime mover. This is a typical example of applied energy resonance. In actual practice, alternators are not short circuited, but are used to deliver power to useful loads.

Applying a resistive load to the output of the alternator of the invention causes a phase shift to occur between the mechanical power wave and the reverse power wave, such that only a portion of the stored inductive energy is fed back from the alternator's power coils to the rotor's momentum; however, if the losses in the alternator have been accurately anticipated, they can be greatly compensated for by choosing the proper ratio of reactance to the intended kilowatt load. This implies that the efficiency of the alternator of the invention is directly proportional to the Q ratio in this energy resonant system.

Should the inductance of the power coils be frequency resonated as suggested by the maximum energy transfer theorem by the introduction of the proper capacitance to the external circuit, the current will immediately fall into phase with the induced voltage, with the overall result that the reverse power transfer wave will degenerate into a sine squared function in phase with the mechanical power. This will destroy the bi-directional power coupling of the system by critically dampening the energy resonance. The result would then be that the alternator of the invention would behave similarly to a conventional alternator.

In summary, immediately upon a reversal after the condition shown in FIG. 8B, the flux zone has begun movement to the right toward the condition shown in FIG. 8C. The flux is increasing and therefore the induced voltage has changed direction. The inductive current component, however, continues to flow in the same direction that it did in FIGS. 8A and 8B. Thus, the force associated with the inductive current continues to be exerted and this thrust is now in cooperation, not opposition, to the movement of the rotor. Therefore, this force no longer produces a torque in opposition to that exerted by the prime mover, but one that assists the prime mover in turning the rotor. Since this phenomenon occurs for a portion of each cycle, immediately following a reversal in direction of the flux zone'e harmonic motion, a prime mover when driving the alternator of the invention will have to exert considerably less effort to turn the rotor shaft than does a prime mover driving a conventional alternator.

As a result, the alternator of the invention exhibits a dramatically increased efficiency of operation, there being a larger ratio of power-out to power-in. The net effect of this phenomenon can be estimated theoretically by taking the ratio of the electrical power available to the mechanical power normally needed to turn the rotor shaft.

A demonstration of the existence and efficacy of the phenomenon described herein emerges from an examination of Tables 1 and 2. Table 1 shows test data for a standard, commercially available alternator while Table 2 shows test data for an alternator produced according to the teachings of the present invention. Each alternator produces power at 60 hertz. Each device was tested using the IEEE Standard Test Procedure for Synchronous Machines, S #115-1983. Those familiar with the art will recognize the definitions and procedures.

TABLE 1

Standard Prior Art Alternator
Segregated Losses & Power Accounting
(in watts at 60 cycles)

| Field Voltage A | Total Input Power Watts B | Friction & Windage Losses at 3600 RPM C | Actual Input Power D | Iron Losses E | Stray Copper Losses F | Resistive Load Wattage G | Total Converted Power H (E + F + G) | Percent Account of Input Energy I (H/D × 100) |
|---|---|---|---|---|---|---|---|---|
| 0  | 232    | 232 | 0.     | 0.    | 0.    | 0.     | 0.      | —      |
| 1  | 236    | 232 | 4.00   | 0.500 | 2.50  | .536   | 3.536   | 88.40% |
| 2  | 240    | 232 | 11.00  | 2.00  | 3.75  | 2.162  | 7.912   | 71.92% |
| 3  | 246    | 232 | 14.00  | 4.00  | 4.90  | 4.260  | 13.160  | 94.00% |
| 4  | 252.50 | 232 | 24.51  | 6.00  | 6.35  | 7.395  | 19.745  | 80.55% |
| 5  | 261.33 | 232 | 29.33  | 9.00  | 7.50  | 10.640 | 27.140  | 92.53% |
| 6  | 268.21 | 232 | 36.21  | 12.50 | 8.75  | 14.340 | 35.590  | 92.28% |
| 7  | 278.77 | 232 | 46.77  | 16.00 | 10.00 | 18.870 | 44.870  | 95.93% |
| 8  | 288.00 | 232 | 56.00  | 20.00 | 11.25 | 23.125 | 54.375  | 97.09% |
| 9  | 298.65 | 232 | 66.65  | 24.00 | 12.50 | 27.533 | 64.033  | 96.07% |
| 10 | 309.40 | 232 | 77.40  | 28.00 | 13.75 | 33.010 | 74.760  | 96.58% |
| 11 | 318.75 | 232 | 86.75  | 32.00 | 14.90 | 37.350 | 84.250  | 97.11% |
| 12 | 327.25 | 232 | 95.25  | 36.00 | 16.25 | 41.460 | 93.710  | 98.38% |
| 13 | 338.40 | 232 | 106.40 | 40.00 | 17.50 | 46.140 | 103.640 | 97.40% |
| 14 | 346.75 | 232 | 114.75 | 43.00 | 18.75 | 50.410 | 112.160 | 97.74% |

TABLE 2

Alternator of Invention
Segregated Losses & Power Accounting
(in Watts at 60 Cycles)

| Field Voltage A | Total Input Power B | Friction & Windage Losses at 1800 RPM C | Actual Input Power D | Iron Losses E | Stray Copper Losses F | Resistive Load Wattage G | Total Converted Power H | Apparent Excess Power J (D − H) | VAR Power K | Total Input Register L (H − K) | Percent Account I |
|---|---|---|---|---|---|---|---|---|---|---|---|
| 14 | 130.50 | 109.58 | 20.92  | 20.42  | 4.80  | 2.471  | 27.691  | −6.771  | 7.102  | 20.588  | 98.41% |
| 16 | 137.96 | 109.58 | 28.38  | 25.42  | 6.66  | 4.070  | 36.150  | −7.770  | 9.919  | 26.231  | 92.42% |
| 20 | 154.78 | 109.58 | 45.20  | 40.34  | 10.00 | 6.826  | 57.166  | −11.966 | 14.652 | 42.514  | 94.05% |
| 24 | 171.00 | 109.58 | 61.42  | 57.92  | 12.50 | 9.758  | 80.178  | −18.758 | 19.229 | 60.949  | 99.23% |
| 26 | 182.72 | 109.58 | 73.14  | 67.22  | 14.80 | 11.359 | 93.379  | −20.239 | 21.750 | 71.629  | 97.93% |
| 28 | 195.50 | 109.58 | 85.92  | 76.50  | 15.20 | 13.289 | 104.989 | −19.069 | 24.188 | 80.801  | 94.04% |
| 30 | 208.86 | 109.58 | 99.28  | 86.34  | 17.20 | 15.411 | 118.951 | −19.671 | 26.629 | 92.322  | 92.99% |
| 32 | 220.65 | 109.58 | 111.07 | 96.58  | 18.50 | 16.945 | 132.025 | −20.955 | 28.408 | 103.617 | 93.28% |
| 34 | 232.00 | 109.58 | 122.42 | 107.92 | 20.50 | 18.852 | 147.272 | −24.852 | 31.050 | 116.222 | 94.93% |
| 36 | 245.66 | 109.58 | 136.08 | 118.47 | 21.33 | 20.390 | 160.190 | −24.110 | 32.414 | 127.776 | 93.89% |
| 38 | 259.30 | 109.58 | 149.72 | 129.17 | 22.50 | 21.896 | 173.566 | −23.846 | 33.800 | 139.766 | 93.35% |
| 40 | 271.55 | 109.58 | 161.97 | 140.42 | 24.00 | 23.553 | 187.553 | −25.583 | 35.954 | 131.599 | 93.59% |
| 42 | 283.23 | 109.58 | 173.65 | 152.12 | 25.20 | 25.080 | 202.40  | −28.750 | 37.570 | 164.83  | 94.92% |
| 44 | 294.17 | 109.58 | 184.59 | 161.82 | 26.66 | 26.419 | 214.899 | −30.309 | 39.070 | 175.829 | 95.25% |
| 46 | 307.28 | 109.58 | 197.70 | 171.64 | 27.50 | 27.887 | 227.027 | −29.327 | 40.599 | 186.428 | 94.29% |
| 48 | 318.76 | 109.58 | 209.18 | 181.79 | 29.33 | 29.583 | 240.703 | −31.523 | 42.789 | 197.914 | 94.61% |
| 50 | 328.38 | 109.58 | 218.80 | 190.26 | 31.00 | 30.992 | 252.252 | −33.452 | 44.388 | 207.864 | 95.00% |
| 52 | 338.15 | 109.58 | 228.57 | 197.92 | 32.00 | 31.979 | 261.899 | −33.329 | 45.362 | 216.537 | 94.73% |
| 54 | 346.16 | 109.58 | 236.58 | 204.22 | 32.50 | 33.040 | 261.760 | −33.180 | 46.017 | 223.743 | 94.57% |
| 56 | 356.26 | 109.58 | 246.68 | 215.43 | 33.33 | 34.226 | 282.986 | −36.306 | 47.009 | 235.977 | 95.66% |
| 58 | 365.40 | 109.58 | 255.82 | 219.82 | 35.00 | 35.976 | 290.796 | −34.976 | 48.684 | 242.112 | 94.64% |

TABLE 2-continued

Alternator of Invention
Segregated Losses & Power Accounting
(in Watts at 60 Cycles)

| Field Voltage A | Total Input Power B | Friction & Windage Losses at 1800 RPM C | Actual Input Power D | Iron Losses E | Stray Copper Losses F | Resistive Load Wattage G | Total Converted Power H | Apparent Excess Power J (D − H) | VAR Power K | Total Input Register L (H − K) | Percent Account I |
|---|---|---|---|---|---|---|---|---|---|---|---|
| 60 | 374.65 | 109.58 | 265.07 | 228.92 | 35.50 | 36.433 | 300.853 | −35.783 | 49.363 | 251.490 | 94.87% |

The tests were conducted by driving each alternator at its operating speed (3600 r.p.m. and 1800 r.p.m., respectively), applying a given d.c. voltage to the field winding, and employing several standard loading techniques. Total input power was measured, and losses were segregated into friction and windage losses, iron losses, and stray copper losses, according to the cited Standard. Finally, the resistive load wattage was measured. With this data, "Actual Input Power" can be calculated after subtracting the purely mechanical losses of friction and windage. It follows directly that this "Actual Input Power" must appear either as a loss (iron losses or stray copper losses) or as power delivered to the resistive load. The accuracy of the procedure can be determined by comparing the total of all losses and delivered power with the "Actual Input Power."

In Table 1 and Table 2, the values of the columns are defined below with all power values in watts:
A—voltage applied to field windings
B—total input power of prime mover
C—friction and windage loss at 3600 RPM
D—actual input power to alternator (B-C)
E—iron losses
F—stray copper losses
G—resistive load wattage
H—total converted power (E+F+G)
I—percent account of input energy (H/D×100)
J—apparent excess power-(D-H)
K—VAR power
L—total input register-(H-K)

An inspection of Table 1, the data obtained from testing a conventional prior art alternator, reveals that this test procedure thoroughly explains the workings of a standard device. Although power determinations are difficult at low levels of field voltage, when one arrives at normal working levels of field voltage, one can consistently account for the allocation or consumption of more than 95% of input power in terms of the stated categories. This is shown by column I, "Percent Account of Input Energy".

Table 2 which is based upon operating data relating to the invention, validates the theoretical presentation above by demonstrating that an alternator according to the invention performs in a radically different manner from a conventional prior art alternator. Specifically, the explanation for the data contained in Table 2 is that the reactive power stored in the power windings is contributing to the power required to turn the rotor. The data for Table 2 were gathered in the same manner as that for Table 1, using the cited Standard. The first point that can be made is that 60-cycle power was produced from this alternator at 1800 r.p.m., rather than the 3600 r.p.m. that conventional teaching would mandate.

As with the standard alternator, actual input power (column D) was measured, and iron losses (column E), stray copper losses (column F), and resistive load wattage (column G) for the alternator of the invention were measured as shown in Table 2. It was found that when one added the loss categories to the resistive load wattage (column G) to obtain a "Total Converted Power" (column H), that total exceeded the "Actual Input Power" (column D). Thus for every level of field voltage tested, the amount obtained for "Total Converted Power" (column H) exceeds the "Actual Input Power" (column D), as reflected in column J labeled "Apparent Excess Power." Of course, this "excess" power must be derived from some source, and the answer is that some of the reactive power stored in the alternator's power winding is being applied to the rotor, as explained above, thereby reducing the work performed by the prime mover. The amount of power so derived is reflected in column K labeled "VAR Power".

For purposes of determining accuracy of the test measurements, the "Actual Input Power" (column D) is added to the absolute value of the "VAR Power" (column K) and the "Apparent Excess Power" (column J) to obtain a "Total Input Register" (column L), which is then compared with the "Total Converted Power" value (column H) to determine the amount of energy actually accounted for. It can be seen that the percent account of input energy (column I) is well over 90%, which is testimony of the accuracy of the measurements shown in Table 2.

The alternator of the invention can be operated as a synchronous alternating current motor. When the power windings, i.e. stator windings are connected to an alternating current source, there is a reaction between the armature currents and the air-gap field which results in a torque when the alternating current source is single phase. The torque tends to drive the rotor one way and then the other. Accordingly the rotor will not run; however if the rotor is driven externally into synchronism with any source of mechanical power, a torque will then be produced that is constant in value and is continually in one direction. This torque will keep the motor running at synchronous speed, even under load.

In the case of a single phase source of alternating current connected to a single phase motor embodiment of the invention, when the stator windings are energized and the rotor is stationary, a constantly reversing torque is produced. Thus, the rotor will not start; however, if the rotor is externally driven to synchronous speed, current flowing in the rotor will then react with the field flux to produce an average torque which is always in one direction. Since the current in the rotor changes as the rotor turns, the instantaneous torque is not constant as in a polyphase motor but pulsates.

It should be understood that the embodiment discussed above and depicted in the drawings is for illustrative purposes only, and that those having skill in the art will understand that modifications and alternations can be made thereto within the spirit of the present invention, which is defined solely by the claims appended hereto.

What is claimed is:

1. An electrical generation device comprising:

a rotor assembly having an axially extending, rotatable shaft, a rotor affixed obliquely to the shaft and including an outer peripheral edge having an axial dimension provided between axially spaced-apart end faces of said rotor, said end faces being obliquely oriented relative to the shaft, circumferentially spaced segments of said outer peripheral edge being in different axial positions along the shaft as a result of the oblique orientation of the rotor to the shaft;

an external magnetic field circuit having at least first and second spaced-apart pole pieces, means for providing a magnetic field extending through the external magnetic field circuit for establishing a single magnetic polarity in each pole piece, with the magnetic poles of said at least first and second spaced-apart pole pieces being of opposite polarities, each of the pole pieces being of an axial dimension greater than the axial dimension of the outer peripheral edge of the rotor and having a face with a plurality of slots therein, and a plurality of power windings disposed in the slots; and means for mounting the rotor assembly for relative motion with respect to the first and second pole pieces of the external magnetic field circuit by rotatably mounting the shaft relative to the external magnetic field circuit such that circumferentially spaced segments of the pheripheral edge of the rotor, in axial section, are substantially parallel to and spaced from confronting faces of said first and second spaced-apart pole pieces for defining an air gap between said pheripheral edge and each of said confronting faces, whereby rotation of the shaft of the rotor assembly oscillates the peripheral edge of the rotor axially back and forth along the confronting faces of said first and second spaced-apart pole pieces with the dimension of said air gap being constant for oscillating the magnetic field in opposite directions axially relative to and through the power windings in the slots of the first and second pole pieces to thereby effect a rate of change of the magnetic field through the power windings without reversing the direction in which the flux flows from one of said first and second pole pieces to the other of said first and second pole pieces and through the rotor and power windings in said first and second pole pieces, to produce alternating voltage in the power windings.

2. The electrical generation device of claim 1 in which the rotor includes a stack of laminations mounted on the shaft at a predetermined angle with respect to the longitudinal axis of said shaft.

3. The electrical generation device of claim 2 in which the lamination stack has an elliptical surface and circular edge contour, rotation of the lamination stack by rotation of the shaft generating a cylindrical surface of revolution.

4. The electrical generation device of claim 2 in which the lamination stack provides a conducting medium for the magnetic flux between the spaced-apart pole pieces, the interactions between the magnetic flux and the power windings producing forces upon the lamination stack in response to its cam-like action and upon the shaft assembly which imparts a torque to the rotor assembly.

5. The electrical generation device of claim 2 in which the lamination stack is in energy resonance with the power windings and a prime mover when connected to the shaft of the rotary assembly which provides a bi-directional power flow between the prime mover and the electrical generation device.

6. The electrical generation device of claim 1 in which the predetermined locations of the slots and the disposition of power windings therein are adapted to be in energy resonance with the rotor stack.

7. The electrical generation device of claim 1 in which the rate of change of the magnetic field with respect to the power winding induces a sixty-cycle voltage within the power windings when a rotational speed of eighteen hundred RPM is imposed upon the shaft of the rotor assembly.

8. The electrical generator device of claim 1 in which the external magnetic field circuit has a plurality of spaced-apart pole pieces.

9. The electrical generation device of claim 1 in which the external magnetic circuit has a pair of spaced-apart pole pieces, the rotor assembly in response to the oblique orientation of the rotor thereof producing two cycles of alternating voltage per revolution of the rotor assembly.

10. An alternator comprising:

a hollow cylindrical stator with the longitudinal axis thereof extending along a predetermined central axis, the stator having a pair of pole pieces each of which extends radially inwardly toward one another with the inner end of each pole piece having a face portion spaced apart from the other, the stator having means for providing a magnetic field extending through the stator and in a direction from one pole piece to the other for establishing a single magnetic polarity in each of said pole pieces, with the polarity of the pole pieces being opposite to each other, a power winding disposed adjacent to the face portion of each pole piece with the turns of each winding substantially facing the face portion of the pole piece; and a rotor of permeable material disposed within the hollow cylindrical stator and extending along the length thereof between the face portions of the pole pieces, the rotor being mounted for rotation about the central axis of the stator and being adapted to be driven in rotation, the rotor having its oppositely disposed end portions extending in spaced apart planes disposed at an oblique angle to the axis of rotation of the rotor assembly and substantially parallel to one another, said rotor having a peripheral edge extending about said axis of rotation, said peripheral edge being substantially cylindrical and nested within the cylindrical stator said peripheral edge having an axial dimension smaller than the axial dimension of the face portions of the pole pieces, segments of the peripheral edge of the rotor being adjacent to face portions of the pole pieces throughout a rotation of the rotor, when the rotor is driven in rotation the rotor being adapted to couple therethrough the magnetic field in a direction from one pole piece to the other with each segment of the peripheral edge of the rotor as said peripheral edge of the rotor is reciprocating in opposite axial directions with respect to and adjacent the face portion of each pole piece and the power windings thereof with a substantially harmonic motion and with a substantially constant air gap, in axial section, between each face portion and the peripheral edge of the rotor, said harmonic motion of the rotor transporting the magnetic field axially back and forth across each power winding without reversing the direction in which flux flows from one pole piece to the other and through the rotor and power windings adjacent said pole pieces, thereby inducing an alternating voltage in the power windings.

11. An alternator in accordance with claim 10 in which the face portion of each pole piece is a portion of a cylinder having its central longitudinal axis disposed substantially along the central axis of the stator.

12. An alternator in accordance with claim 10 in which the turns of each power winding have portions extending spaced apart from one another and at an angle to the central axis of the stator and additional portions extending spaced apart from one another in a direction substantially parallel to the central axis of the stator.

13. An alternator in accordance with claim 10 in which the turns of each power winding have portions extending spaced apart from one another and substantially at right angles to the central axis of the stator and additional portions extending spaced apart from one another and substantially parallel to the central axis of the stator.

14. An alternator in accordance with claim 10 in which the face portion of each pole piece contains a recess corresponding to the form of the turns of the power winding therein and being adapted to receive the turns of the power winding therein.

15. An alternator in accordance with claim 14 in which the recess is in the form of a slot extending into the face portions of the pole pieces.

16. An alternator in accordance with claim 10 in which the means for providing a magnetic field extending through the stator and the rotor comprises a field winding having turns disposed about the stator and adapted to produce a magnetic field therein.

17. An alternator in accordance with claim 10 in which each pole piece is a portion of a cylinder having its central longitudinal axis disposed substantially along the central axis of the stator and in which the peripheral of the rotor when rotating generates a cylindrical figure of revolution which has a radius extending perpendicular to the face of each pole piece to form a narrow air gap therewith.

18. An alternator in accordance with claim 10 in which the rotor comprises a plurality of laminations to reduce eddy currents therein the plurality of laminations extending substantially parallel to the oblique angle of the end portions of the rotor.

19. An alternator in accordance with claim 15 in which the oblique angle of the plane of the end portions of the rotor to the pivotal axis thereof is approximately forty-five degrees.

20. An alternator in accordance with claim 10 in which the turns of each power winding include portions oppositely disposed at a predetermined distance along the pole piece in the direction of the central axis of the stator and extending with respect thereto at an angle to the central axis of the stator and in which a portion of the periphery of the rotor reciprocates in opposite directions relative thereto along a path of travel at least equal to and in alignment with the predetermined distance between the portions of the turns.

21. An alternating current motor comprising:
a rotor assembly having an axially extending, rotatable shaft, a rotor affixed obliquely to the shaft and including an outer peripheral edge having an axial dimension provided between axially spaced-apart end faces of said rotor, said end faces being obliquely oriented relative to the shaft, circumferentially spaced segments of said outer peripheral edge being in different axial positions along the shaft as a result of the oblique orientation of the rotor to the shaft;
an external magnetic field circuit having at least first and second spaced-apart pole pieces, means for providing a magnetic field extending through the external magnetic field circuit for establishing a single magnetic polarity in each pole piece, with the magnetic poles of said at least first and second spaced-apart pole pieces being of opposite polarities, each of the pole pieces being of an axial dimension greater than the axial dimension of the outer peripheral edge of the rotor and having a face with a plurality of slots therein, and a plurality of power windings disposed in the slots, said power windings being adapted to be connected to a source of alternating current; and
means for mounting the rotor assembly for relative motion with respect to the first and second pole pieces of the external magnetic field circuit by rotatably mounting the shaft relative to the external magnetic field circuit such that circumferentially spaced segments of the peripheral edge of the rotor, in axial section, are substantially parallel to and spaced from confronting faces of said first and second spaced-apart pole pieces for defining an air gap between said peripheral edge and each of said confronting faces, whereby the power windings when energized by the alternating current source and linked by the magnetic field extending through the external magnetic circuit producing a torque which rotatably drives the rotor assembly to cause the peripheral edge of the rotor to oscillate back and forth axially relative to the confronting faces of the first and second spaced-apart pole pieces with the dimension of the air gap being substantially constant and without changing the direction of flux flow from one of said first and second pole pieces to the other of said first and second pole pieces and through the rotor and power windings in said first and second pole pieces.

22. The alternating current motor of claim 21 in which the rotor includes a lamination stack mounted on the shaft at a predetermined angle with respect to the longitudingal axis of said shaft.

23. The alternating current motor of claim 22 in which the lamination stack provides a conducting medium for the magnetic flux between the spaced apart pole pieces and the appliclation of an alternating current to the power windings causes a harmonic motion of the external magnetic field with respect to the spaced apart pole pieces, giving rise to lateral forces, in accordance with the Lenz law, which are brought to bear upon the cam-like structure of the rotor, thereby developing a torque which causes it to rotate.

24. An alternating current motor comprising:
a hollow cylindrical stator with the longitudinal axis thereof extending along a predetermined central axis, the stator having a pair of pole pieces each of which extends radially inwardly toward one another with the inner end of each pole piece having a face portion spaced apart from the other, the stator having means for providing a magnetic field extending through the stator and from one pole piece to the other for establishing a single magnetic polarity in each of said pole pieces, with the polarity of the pole pieces being opposite to each other, a power winding disposd adjacent to the face portion of each pole piece with the turns of each winding substantially facing the face portion of the pole piece, the power winding being adapted to be connected to a source of alternating current; and a rotor of permeable material disposd within the hollow cylindrical stator and extending along the length thereof between the face portions of the pole pieces, the rotor being mounted for rotation about the central axis of the stator, the rotor having its oppositely disposed end portions extending in spaced apart planes disposed at an oblique angle to the axis of the stator and substantially parallel to one another, said rotor having a peripheral edge extending about the axis, said peripheral edge being substantially cylindrical and nested within the cylindrical stator, said peripheral edge having an axial dimension smaller than the axial dimension of the face portions of the pole pieces, segmemts of the peripheral edge of the rotor being adjacent to face portions of the pole pieces with a constant air gap, in axial section, throughout a rotation of the rotor, the rotor being adapted to couple therethrough the magnetic field in a direction from one pole piece to the other with each segment of the peripheral edge of the rotor as said peripheral edge of the rotor is reciprocating in opposite axial directions with respect to and adjacent the face portion of each pole piece and the power winding thereof with a substantially harmonic motion produced by the interaction of the external magnetic field and the magnetic field developed by the presence of an alternating current within the power windings of each pole piece, and giving rise to lateral forces, in accordance with the Lenz law, which are brought to bare upon the cam-like structure of the rotor, thereby developing a torque which causes said rotor to rotate without changing said direction of flux flow from one pole piece to the other and through the rotor and power windings adjacent said pole pieces.

25. An alternating current motor in accordance with claim 24 in which the turns of each power winding have portions extending spaced apart from one another and at an angle to the central axis of the stator and additional portions extending spaced apart from one another in a direction substantially parallel to the central axis of the stator.

26. An alternating current motor in accordance with claim 24 in which the means for providing a magnetic field extending through the stator and the rotor comprises a field winding having turns disposed about the stator and adapted to produce a magnetic field therein.

27. An alternating current motor in accordance with claim 24 in which each pole piece is a portion of a cylinder having its central longitudinal axis disposed substantially along the central axis of the stator and in which the periphery of the rotor when rotating generates a cylindrical figure of revolution which has a radius extending perpendicular to the face of each pole piece to form a narrow air gap therewith.

28. An alternating current motor in accordance with claim 24 in which the rotor comprises a plurality of laminations to reduce eddy currents therein, the plurality of laminations extending substantially parallel to the oblique angle of the end portions of the rotor.

29. An alternating current motor in accordance with claim 28 in which the oblique angle of the plane of the end portions of the rotor to the pivotal axis thereof is approximately forty-five degrees.

30. An alternating current motor in accordance with claim 24 in which the turns of each power winding include portions oppositely disposed at a predetermined distance along the pole piece in the direction of the central axis of the stator and extending with respect thereto at an angle to the central axis of the stator and in which a portion of the periphery of the rotor reciprocates in opposite directions relative thereto along a path of travel at least equal to and in alignment with the predetermined distance between the portions of the turns.

31. The electrical generation device of claim 1 wherein the windings in the slots are free of the air gaps.

32. The alternating current motor of claim 21 wherein the windings in the slots are free of the air gaps.

* * * * *